United States Patent [19]

Brack

[11] 3,989,609
[45] Nov. 2, 1976

[54] RADIATION CURABLE RESISTANT COATINGS AND THEIR PREPARATION

[75] Inventor: Karl Brack, Upton, Mass.

[73] Assignee: Dennison Manufacturing Company, Framingham, Mass.

[22] Filed: Sept. 24, 1973

[21] Appl. No.: 409,364

[52] U.S. Cl. .................. 204/159.15; 204/159.16; 204/159.19; 260/18 TN; 260/28.5 R; 260/31.6; 260/37 N; 260/42.53; 260/827; 260/857 R; 260/857 UN; 260/859 R; 427/36; 427/37; 427/44; 427/54; 428/423; 428/425; 428/458; 428/476

[51] Int. Cl.² .................. C08F 8/00; C08G 18/06; C08L 75/06; C08L 75/08

[58] Field of Search .... 260/859 R, 159.16, 77.5 AP; 204/159.15, 159.19

[56] References Cited
UNITED STATES PATENTS

| | | | |
|---|---|---|---|
| 3,297,745 | 2/1967 | Fekete et al. | 260/77.5 AP |
| 3,396,210 | 8/1968 | McKillip et al. | 260/859 R |
| 3,509,234 | 4/1970 | Burlant et al. | 260/859 R |
| 3,509,234 | 4/1970 | Burlant et al. | 260/859 R |
| 3,532,652 | 10/1970 | Zang et al. | 260/859 R |
| 3,607,974 | 9/1971 | Holicky | 260/859 R |
| 3,641,199 | 2/1972 | Niederhauser et al. | 260/859 R |
| 3,642,943 | 2/1972 | Noel | 260/859 R |
| 3,782,961 | 1/1974 | Takahaski et al. | 204/159.15 |
| 3,829,531 | 8/1974 | Graff | 260/859 R |
| 3,864,133 | 2/1975 | Hisamatsu et al. | 204/159.19 |

*Primary Examiner*—Murray Tillman
*Assistant Examiner*—Thurman K. Page
*Attorney, Agent, or Firm*—Thompson, Birch, Gauthier & Samuels

[57] ABSTRACT

A prepolymer containing unsaturated hydrocarbon groups is prepared and mixed on a roller mill with one or more acrylic ester monomers and various additives to make a coating formulation of a desired viscosity. In general, low viscosity formulations are used for overprint varnishes, on paper or foil, or, with pigments, for certain types of printing inks. Higher viscosity formulations are used to apply thick films on panels, tiles or other bodies. Thin films are cured to hardness by brief exposure to ultraviolet light. Thicker films require more energetic radiation such as plasma arc and electron beam radiation. The prepolymers particularly useful for making such radiation curable coatings are the reaction products of polyether polyols and bis- or polyisocyanates and hydroxy alkenes or acrylic (or methacrylic) hydroxy esters, and, likewise, reactive polyamides modified with dicarboxy alkenes, their anhydrides or esters. A small amount of wax incorporated in the coating formulations results in coatings with release characteristics similar to those of PTFE coatings.

10 Claims, No Drawings

RADIATION CURABLE RESISTANT COATINGS AND THEIR PREPARATION

This invention relates to radiation curable and radiation cured coatings such as inks, varnishes and release coatings, methods of making the same and prepolymer materials suitable for making such coatings. These coatings are curable by ultraviolet radiation as well as by plasma arc and an electron beam radiation, which for present purposes shall be deemed to be a form of radiation curing. In particular this invention relates to polyether-urethane prepolymers and polyamide prepolymers modified for radiation curability by introduction of a suitable modifier.

Coatings for paper, foil, panels and tiles are desired that are resistant to abrasion and to solvents. Such coatings are particularly desired to protect notices and labels exposed on appliances and other articles. Inks for printing on surfaces subject to wear and exposure should also have resistance to solvents and to abrasion. The resistant materials, principally epoxy materials and polyurethane materials, generally require long curing times and as heretofore available are not curable quickly by irradiation. Industry has resorted to completing the polymerization in solvents and depositing the hard resin from the solvent. Such coatings are, however, sensitive to solvents. Likewise, polyamide resins with toughness and adhesion suitable for printing inks as heretofore prepared have not been radiation curable. The art has therefore had to choose between (1) deposition of cured resins from solvents yielding coatings sensitive to solvents, (2) lengthy curing of coatings, or (3) use of inferior materials merely because of more rapid curing qualities.

It is an object of this invention to provide radiation curable coatings applied in the form of a prepolymer-monomer mixture that will have good abrasion resistance and solvent resistance after curing, and especially to provide radiation curable film-forming prepolymers of unsaturated polyether-polyurethanes and likewise of unsaturated polyamides.

It is a further object of this invention to provide such coatings as varnishes, release coatings and inks.

It is a still further object of this invention to provide hard, abrasion and solvent resistant polymerized films without the use of solvents that must be evaporataed from the films.

SUBJECT MATTER OF THE PRESENT INVENTION

An unsaturated prepolymer is mixed with acrylic monomers and additives as further described below. Suitable unsaturated prepolymers are unsaturated polyetherpolyurethane prepolymers or polyamides prepared by reacting polyether polyols with bis- or polyisocyanates and an unsaturated reagent or by reacting reactive polyamides with dicarboxyalkenes, their anhydrides or their esters. In the preparation of these prepolymers a step of driving off volatile materials such as solvents can be avoided if an acrylic monomer is used as the solvent (i.e. a monomer which normally would be admixed in the succeeding formulation step). Sometimes an agent for inhibiting further polymerization (depending upon the nature of the prepolymer) is present.

The prepolymers, which in some cases already contain an acrylic ester reagent, if an acrylic monomer is used as a solvent and/or if an excess of acrylic hydroxyalkyl ester was used in the prepolymer preparation, are then compounded on a mill with a further quantity of unsaturated reagent, in this case one or more acrylic or methacrylic esters (whether or not the same unsaturated reagent was used in preparing the polymer). Additives, as further described below, are appropriately added at this formulating stage. After milling the material is spread as a film and then irradiated briefly to cure it.

One particularly useful prepolymer is a polyetherpolyurethane prepolymer prepared in the presence of a substantial amount of an unsaturated alcohol or a hydroxy acrylic or hydroxy methacrylic ester. Another particularly useful prepolymer according to the invention is the reaction product of a polyamide material having free amine groups with a dicarboxylic unsaturated acid or a lower ester or anhydride of such an acid. If an ink is to be made, a solvent and a pigment is added at the stage of mill compounding, after which the resulting material may be applied with a rubber roller to coat a surface. In each case the coating is cured after it has been applied on the paper, foil, panel, tile, or the like.

A valuable new class of release coatings may be made by adding to the reaction a small quantity of a paraffin wax, an ester wax, a fluorinated hydrocarbon wax or some other waxy organic material such as a higher alkyl alcohol or acid or oleamide, or a nonorganic waxy material such as a polysiloxane or silane. Release coatings of this invention can also be prepared by radiation curing of a wax-containing acrylic prepolymer material comprising mainly acrylic monomers and a photoinitiator additive of the kind described further below.

It has been found that the prepolymer materials of this invention cure extremely well with ultraviolet light and with electron beams. Thin films of the order of one mil or less cure readily with ultraviolet light. Thick films may require more penetrating radiation, particularly if a pigment is present, and for these plasma arc radiation, electron beam radiation, or X-rays are desirable.

The preparation of unsaturated polyetherpolyurethane prepolymers for making radiation curable coatings in acccordance with the invention begins with reacting a diisocyanate with a polyol at a temperature not exceeding 75° C. in the presence of a catalyst chosen for a low degree of promotion of side reactions. Stannous octoate is preferred as a catalyst. Stannous butyrate and stannous laurate have also been found usable. Because of the high viscosity of the reaction product, the reaction is carried out in a solvent. The solvent may be either a hydrocarbon such as toluene, in which case it must be removed by evaporation later, or it may be an acrylate material of the class of materials suitable for use in ink and coating formulations, in which case the solvent may be allowed to remain in the product. Examples of the latter type of solvent are: trimethylolpropane triacrylate, 1,6-hexanedioldiacrylate, 1,3-butanediol diacrylate, neopentylglycol diacrylate, pentaerythritol tetramethacrylate, etc. The solvent must be dry to avoid the production of by-products.

The reaction in the solvent is carried out in a vessel equipped with an agitator and blanketed with nitrogen. The mixture is stirred at room temperature as the polyol is added to the diisocyanate and the addition is carried out at such a rate that with the available water cooling the temperature of the reaction mixture does not rise above 50° C. Then after an hour or so of maintaining the reaction mixture at 50° C. or just below that temperature, an unsaturated oxygenated hydrocarbon bearing a hydroxyl group, either an alcohol or a hydroxy ester is added, preferably somewhat in excess, as for example 10% in excess, of the amount needed to react with those isocyanate groups which are left unreacted after the reaction with the polyether polyol. At this point it is preferabale to switch from blanketing the reaction mixture with dry nitrogen to blanketing with dry air (oxygen is a good polymerization inhibitor). The porportion of the added unsaturated component to the remainder of the reaction mixture, not counting any solvent present, can vary over a wide range, from 3:1 to 1:10. During this addition the reaction mixture may be permitted to rise to 75° C., but no further. After the addition is terminated, the temperature is raised to 90° C. and after an hour or so a small amount of p-methoxyphenol is added to inhibit premature polymerization. When a hydrocarbon solvent is to be removed, it is best to remove the solvent under reduced pressure at a temperature as low as possible, in order to avoid premature polymerization of the prepolymer.

As will be made clear from the following examples, the modified prepolymer material may be an oil, with or without an acrylate ester admixture, or it may be a solid resin. The next step is to compound the modified prepolymer as above prepared with one or more acrylate monomer esters on a roller mill. It is preferred to have trimethylolpropane triacrylate included as one of the components of this material, and of course sometimes this component is already there for having been used as a solvent in the previous step. Other components for use at this stage are acrylated epoxidized soybean oil, hydroxyethyl acrylate, hydroxyethyl methacrylate, 1,4-butanediol diacrylate, neopentyl glycol diacrylate, pentaerythritol tetra-acrylate, pentaerythritol triacrylate, hexanediol diacrylate, butyl acrylate, isodecyl acrylate, octadecylacrylate, dimethyl amino-ethyl methacrylate, acrylic acid, methacrylic acid, acrylamide and/or methylene bis-acrylamide, and the like.

It is also essential to introduce at this stage a small to moderate amount of a photoinitiator for coatings to be cured by UV or plasma arc radiation (i.e. by actinic light generally). Coatings to be cured by electron beam or X-ray radiation do not require a photoinitiator. The following are suitable photoinitiators for coatings according to this invention: benzil, benzoin, benzoin alkyl ethers, acyloin derivatives in general, benzophenone, acetophenone and Michler's ketone. Other compounds useful as photoinitiators for this purpose are those listed in Table 5–13, page 132, *Molecular Photochemistry* by N. J. Turro (W. Benjamin, Inc., 1967).

If a release coating is to be prepared, there is introduced at this stage between one half of 1% and a few percent of wax, either paraffin wax, ester wax, a fluorocarbon wax or some other waxy organic compound such as a higher alkyl alcohol or acid or oleamide, or a waxy silicon-containing material such as polysiloxane, silicone or silane or a mixture of some of these. Even a small quantity of such waxy material tends to migrate to the surface of the coating and provides a release type surface characteristic similar to that of fluorocarbon polymers or silicones.

When the monomers added at this stage are such as to produce a mixture of low viscosity, the result is a coating material very useful as an overprint varnish. The coating can be cured by an exposure to ultraviolet radiation from a medium pressure mercury lamp for from 0.1 second to several seconds to form a hard glossy coating. When the monomers added are such as to produce a heavy oil, the resulting material is useful for coating rigid panels, such as paperboard or veneer panels, with a film having a thickness of one to several mils. In this case ultraviolet light is insufficient to provide quick curing and higher energy radiation must be used, such as electron beam radiation or X-rays. In the absence of air, an exposure to about 2–6 Mrad is sufficient for curing with electron beam radiation. In the presence of air, 10–20 Mrad or more are needed.

For the manufacture of inks having the desirable qualities of the coatings of the invention, pigments such as Lithol rubine pigment, molybdate orange, chrome yellow, phthalocyanine blue, carbon black or dyes are mixed in at the same time as most of the acrylic monomers. Here also it is necessary to add 5–20% of a photoinitiator to inks intended to be curable by UV or plasma arc radiation. The resulting ink may be printed onto paper, paperboard, plastic film, metal or other stock, and the printing can be rapidly cured by exposure for a fraction of a second to ultraviolet light from a low pressure mercury lamp. An abrasion resistant and solvent resistant printing is thereby produced, which does not require an overprint varnish.

The foregoing aspects of the invention are illustrated in detail in the following examples. Examples 1–9 and 15–22 illustrate the preparation of prepolymers used in the formulations described in Examples 10–14 and 23–26. Examples 27–69 refer particularly to release type coatings.

EXAMPLE 1

522 parts 2,4-toluene diisocyanate, 500 parts dried toluene and 0.5 parts stannous octoate are placed in a vessel equipped with an agitator and blanketed with nitrogen. With stirring, a solution of 735 parts poly (propylene oxide) triol (Dow Voranol, CP700, Hydroxyl No. 229; 0.02% $H_2O$) in 750 parts dried toluene is added at such a rate that the temperature of the reaction mixture does not exceed 50° C. The reaction mixture is stirred at 50° C. for 1 hour. Then the nitrogen blanket is replaced by a dry air blanket and 383 parts hydroxyethyl acrylate (10% excess), mixed with 100 parts of dried toluene, are added at such a rate that the temperature of the mixture does not rise above 75° C. After the addition is completed, the reaction mixture is kept stirring at 90° C. for 1 hour. 1 part p-methoxy phenol ((polymerization inhibitor) is added and the solvent is removed under reduced pressure at or below 30° C. 1650 parts of a clear, colorless, resinous oil, containing a trace of toluene solvent are obtained. Analysis of this material shows 0.06% isocyanate content.

EXAMPLE 2

522 parts, 2,4-toluene diisocyanate, 500 parts dried toluene and 0.5 part stannous octoate are placed in a vessel equipped with an agitator and blanketed with nitrogen. With stirring, a solution of 735 parts poly (propylene oxide) triol (Dow Voranol CO700; Hydroxyl No. 229; 0.02% $H_2O$) in 750 parts dried toluene is added at such a rate that the temperature of the reaction mixture does not exceed 50° C. The reaction mixture is stirred at 50° C. for 1 hour. Then 191.4 parts allyl alcohol (10% excess) are added at such a rate that the temperature of the mixture does not rise above 75° C. After the addition is completed, the reaction mixture is kept stirring at 90° C. for 1 hour. 1 part p-methoxy phenol (polymerization inhibitor) is added and the solvent is removed under reduced pressure at or below 30° C. 1440 parts of a clear, colorless, resinous oil, containing a trace of toluene, are obtained. Analysis of the resulting material shows 0.04% isocyanate content.

EXAMPLE 3

522 parts 2,4-toluene diisocyanate, 780 parts trimethylol propane triacrylate, and 0.5 parts stannous octoate are placed in a vessel equipped with an agitator and blanketed with nitrogen. With stirring, 735 parts of poly (propylene oxide) triol (Dow Voranol CP700; hydroxyl No. 229; 0.02% $H_2O$) are added at such a rate that the temperature of the reaction mixture does not rise above 50° C. The reaction mixture is kept at this temperature for an additional 1 hour. Then the nitrogen blanket is replaced by a dry air blanket and 383 parts hydroxyethyl acrylate (10% excess) are added at such a rate that the temperature of the reaction mixture does not exceed 75° C. The reaction mixture is stirred for an additional 1 hour at 90° C. Then 1 part p-methoxy phenol is added and the reaction mixture is allowed to cool to room temperature. The product, 1605 parts of unsaturated prepolymer in 780 parts of trimethylolpropane triacrylate and 35 parts of hydroxyethyl acrylate, is a clear, colorless, viscous oil. Analysis of the resulting material shows 0.06% isocyanate content.

EXAMPLE 4

522 parts, 2,4-toluene diisocycanate, 780 parts trimethylolpropane triacrylate, and 0.5 part stannous octoate are placed in a vessel equipped with an agitator and blanketed with nitrogen. With stirring, 735 parts of poly (propylene oxide) triol (Dow Voranol CP700; Hydroxyl No. 229; 0.02% $H_2O$) are added at such a rate that the temperature of the reaction mixture does not rise above 50° C. The reaction mixture is kept at this temperature for an additional 1 hour. Then 191.4 parts allyl alcohol (10% excess) are added at such a rate that the temperature of the reaction mixture does not exceed 75° C. The reaction mixture is stirred for an additional 1 hour at 90° C. Then 1 part p-methoxy phenol is added and the reaction mixture is allowed to cool to room temperature. The product consists of 1413 parts unsaturated prepolymer in 780 parts trimethylolpropane triacrylate and 17.4 parts allyl alcohol. It is a clear, colorless, viscous oil. Analysis of the resulting material shows 0.03% isocyanate content.

EXAMPLE 5

504 parts 1,6-hexamethylene diisocyanate, 750 parts trimethylolpropane triacrylate, and 0.5 parts stannous octoate are placed in a vessel equipped with an agitator and blanketed with nitrogen. With stirring, 735 parts of poly (propylene oxide) triol (Dow Voranol CP700; Hydroxyl No. 229; 0.02% $H_2O$) are added at such a rate that the temperature of the reaction mixture does not rise above 50° C. The reaction mixture then is kept at 60° C for 2 hours with stirring. Following this, 409.2 parts 5-norbornene-2-methanol (10% excess) are added at such a rate that the temperature of the reaction mixture does not rise above 75° C. After the addition is completed, the temperature is raised to 90° C. and the reaction mixture is stirred at this temperature for an additional 2 hours. Then the reaction mixture is allowed to cool to room temperature. The product consists of 1611 parts unsaturated prepolymer in 700 parts trimethylolpropane triacrylate and 37.2 parts 5-norbornene-2-methanol. It is a clear, colorless, viscous oil. Analysis of the resulting material shows 0.08% isocyanate content.

EXAMPLE 6

750 parts p,p'-diphenylmethane diisocyanate, 1000 parts toluene, and 0.5 part stannous octoate are placed in a vessel equipped with an agitator and blanketed with nitrogen. The mixture is stirred at room temperature and 258 parts poly (propylene oxide) triol (Voranol CP260; Hydroxyl No. 653; 0.02% $H_2O$) are added at such a rate that the temperature of the reaction mixture does not rise above 50° C. The reaction mixture is kept at this temperature for an additional 1 hour. Then the nitrogen blanket is replaced by a dry air blanket and 383 parts of hydroxyethyl acrylate (10% excess) are added at such a rate that the temperature of the reaction mixture does not exceed 75° C. After the addition is terminated, the temperature of the reaction mixture is raised to 90° C. for 1 hour. After adding 1.0 part p-methoxy phenol, the reaction mixture is allowed to cool to room temperature and the solvent is removed under reduced pressure at or below 30° C. The product, 1398 parts, is a clear off-white resin. Analysis of the resulting material shows 0.01% isocyanate content.

EXAMPLE 7

1746 parts dimeryl diisocyanate, 500 parts dried toluene, and 1.0 part stannous octoate are placed in a vessel equipped with an agitator and blanketed with nitrogen. With stirring, 258 parts poly (propylene oxide) triol (Dow Voranol CP260; Hydroxyl No. 653; 0.02% $H_2O$) are added at such a rate that the temperature of the reaction mixture remains below 50° C. After the addition is completed, the reaction mixture is kept at 60° C. for 2 hours with stirring. Then 191.4 parts of allyl alcohol (10% excess) are added at such a rate that the temperature of the reaction mixture does not exceed 75° C. After the addition is completed the temperature is raised to 90° C. and the reaction mixture is kept stirring at this temperature for 2 hours. Then 1.0 part p-methoxy phenol is added, and the solvent is removed under reduced pressure. 2185 parts clear, colorless heavy oil is obtained as the product. Analysis of the resulting material shows 0.08% isocyanate content.

EXAMPLE 8

774 parts 4,4'-dicyclohexylmethane diisocyanate, 1000 parts trimethylolpropane triacrylate, and 0.5 part stannous octoate are placed in a vessel equipped with an agitator and blanketed with nitrogen. The mixture is stirred at room temperature and 735 parts of poly (propylene oxide) triol (Dow Voranol CP700; Hydroxyl No. 229; 0.2% $H_2O$) are added at such a rate that the temperature does not exceed 50° C. After the addition is completed, the reaction mixture is kept stirring at 50° C. for an additional 1 hour. Then the nitrogen blanket is replaced by a dry air blanket and 383 parts hydroxyethyl acrylate (10% excess) are added at such rate that the temperature of the reaction mixture does not rise above 75° C. Following this step the reaction mixture is stirred for 2 hours at 90° C. Then 1.0 part p-methoxyphenol is added and the reaction mixture is allowed to cool to room temperature. The product, a clear, colorless, viscous oil, consists of a mixture of 1857 parts unsaturated prepolymer, 1000 parts trimethylolpropane triacrylate, and 35 parts hydroxyethyl acrylate. Analysis of the resulting material shows 0.06% isocyanate content.

EXAMPLE 9

348 parts 2,4-toluene diisocyanate, 500 parts dried toluene, and 0.5 part stannous octoate are placed in a vessel equipped with an agitator and blanketed with nitrogen. Then 407 parts poly (propylene oxide) diol (Dow Voranol P400; Hydroxyl No. 275; 0.02% $H_2O$) are added at such a rate that the temperature of the reaction mixture does not rise above 50° C. The reaction mixture is stirred at this temperature for an additional hour. Following this step, 286 parts hydroxyethyl methacrylate (10% excess) are added at such a rate that the temperature of the reaction mixture is raised to 90° and the stirring continued for an additional 1 hour. At the end of this period 1.0 part p-methoxy phenol is added and the solvent is removed under reduced pressure. A clear, colorless, viscous oil is obtained as the product. Analysis of the resulting material shows 0.02% isocyanate content.

EXAMPLE 10 — UV Curable Overprint Varnish 100 parts of the product of Example 1, 235 parts trimethylolpropane triacrylate, 30 parts hydroxyethyl acrylate, 3 parts stearyl acrylate and 25 parts benzoin isobutyl ether are mixed well on a roller mill. A clear, colorless homogeneous light oil is obtained as the product.

Films of 0.4 mil thickness are applied with a wire wound coating rod onto paper, aluminum foil, vinyl coated aluminum foil, polyester coated mylar, and steel. The coated substrates are exposed for 1/10 second to the UV radiation given off by a medium pressure mercury vapor lamp (Hanovia 200 W/inch) at a distance of 5" from the lamp. This distance coincides with the second focal point created by the elliptical reflector.

After this exposure all samples are cured to hard, glossy coatings with a pencil hardness of at least 2H and a rub-resistance of at least 40 rubs, using methyl ethyl ketone as the solvent.

EXAMPLE 11 — UV Curable Overprint Varnish 20 parts reaction product from Example 3, 8 parts trimethylol propane triacrylate, 12 parts 1,4-butanediol diacrylate, 10 parts acrylated epoxidized soybean oil (Union Carbide Co. Actomer X-70), 10 parts acrylic acid, 0.4 part stearyl acrylate and 2.75 parts benzoin isobutyl ether are mixed on a roller mill. A homogeneous, clear, colorless light oil is obtained. Films are applied and cured as shown in Example 10. The cured films have a pencil hardness of HB, are insoluble in solvents and rub resistant.

EXAMPLE 12 — Electron Beam Curable Coating 30 parts of reaction product from Example 3, 20 parts trimethylolpropane triacrylate and 10 parts neopentyl glycol diacrylate are mixed on a roller mill. A clear, colorless heavy oil is obtained as the product. Steel and wood panels are coated with this composition with a 1 mil film knife. The coated test panels are exposed to 6 Mrad electron beam radiation under exclusion of air. After the irradiation, the coatings are clear, colorless, and glasslike. They have a pencil hardness of 4H, show excellent adhesion to metal and wood and are unaffected by solvent.

EXAMPLE 13 — Electron Beam Curable Coating 20 parts reaction product from Example 3, 10 parts trimethylolpropane triacrylate, 10 parts reaction product from Example 9, 10 parts acrylated epoxidized soybean oil (Union Carbide Co. Actomer X-70), 10 parts neopentyl glycol dioacrylate and 1 part stearyl acrylate are mixed on a roller mill until homogeneous. A clear, colorless, medium viscosity oil is obtained. Coatings of 4 mil thickness are applied with a film knife to asphalt tile, vinyl asbestos tile, vinyl tile and wood. The coated panels are exposed to 6 Mrad electron beam radiation under exclusion of air. After the irradiation, the coatings are tough, clear, colorless and very abrasion resistant.

EXAMPLE 14 — UV Curable Ink 60 parts of reaction product from Example 3, 10 parts Lithol rubine pigment, 10 parts pentaerythritol tetraacrylate and 3 parts stearyl acrylate are mixed and ground on a three-roll mill until homogeneous. Then 5.4 parts benzoin isobutyl ether dissolved in 10 parts trimethylolpropane triacrylate are added and the milling is continued until the sensitizer is incorporated. The ink is applied to paper stock as a film of 0.1 – 0.4 mil thickness by means of a rubber roller. Complete cure of the ink is achieved by exposure to UV radiation for 0.5 second as described in Example 10.

As previously mentioned, modified polyamide prepolymers prepared in accordance with the invention are also radiation curable and likewise useful for overprint varnishes, for protective films on panels and tiles and for abrasion and solvent resistant inks.

A preferred starting material for the preparation of these modified prepolymers is a polyamide polyamine, a material that is made by condensing an excess of polyamine with polycarboxylic acids, giving a still reactive condensation product. These are available in some variety, for example, under the trade names of Versamid and Emerez. Of course the modification in accordance with the invention could be made part of the original polyamide process, just as was above described in connection with the polyurethane process. It is convenient, however, to use these polyamide polyamine materials as starting materials. The materials are sometimes known as reactive polyamide resins and contain primary and secondary amine groups.

The above-described starting material is mixed with a smaller portion of an ethyl or methyl ester, or an anhydride, of an unsaturated dicarboxylic acid. The reaction mixture is stirred at a temperature such as 90° C. for a few hours and a slow stream of nitrogen is used to carry off the methanol or ethanol, which may be recovered by a cold trap. The reaction mixture is then stripped at low pressure (0.1 mm Hg), while stirring at 90° C. to remove unreacted ester and more methanol or ethanol. Finally, the product is allowed to cool in the presence of a small amount of p-methoxyphenol to inhibit premature polymerization. The ester that is recovered during low pressure stripping may be an isomerization product of the ester supplied to the reaction. Thus, dimethyl maleate may be rearranged into dimethyl fumarate, and dimethyl itaconate may be partly isomerized to the mesaconate and the citraconate.

The products of the reaction described are in some cases oils and in other cases resins. They are thereafter compounded on a roller mill with acrylic monomer esters, additives and then films are prepared and cured from the resulting mixture in substantially the same manner as already described in connection with the unsaturated polyether-polyurethane prepolymers. Further details regarding this aspect of the invention will be apparent from the following illustrative examples.

EXAMPLE 15

205 parts of a reactive polyamide resin (derived from the condensation of polymerized fatty acids with polyalkylamines and containing primary and secondary amine groups; General Mills chemicals, Versamid 115, amine number 238) and 30 parts of dimethyl maleate are mixed in a vessel equipped with an agitator. The vessel is swept with a slow stream of nitrogen while the reaction mixture is stirred at 90° C. for 3 hours. During this time 3 parts of methanol (identified by gas chromatography) are recovered from the off-gas by means of a cold trap. In order to remove any unreacted dimethyl maleate, the reaction mixture is stripped at 0.1 mm Hg pressure while stirring at 90° C. During this time another 2 parts of methanol are recovered, but no unreacted dimethyl maleate. Then 0.1 part p-methoxyphenol is added and the product is allowed to cool to room temperature. 230.2 parts of a resinous, clear, but slightly yellowish oil are obtained. It is calculated that the ratio (dimethyl maleate reacted)/(amine) is equal to 0.25.

EXAMPLE 16

This preparation is carried out as described in Example 15. 100 parts Versamid 115 are reacted with 40 parts dimethyl maleate for 3 hours at 90° C. On stripping under reduced pressure approximately 17 parts of dimethyl fumarate and approximately 4 parts of methanol are recovered (both components are identified by gas chromatography). After adding 0.05 part p-methoxyphenol, the product is allowed to cool to room temperature. 117 parts of a greenish-yellow resin are obtained. It is calculated that the ratio (dimethyl maleate reacted)/(amine) is equal to 0.35.

EXAMPLE 17

This preparation is carried out as described in Example 15. 99.1 parts Versamid 115 and 40 parts dimethyl maleate are reacted at 90° C. for 5 hours. Approximately 6 parts methanol are formed during this time. After adding 0.05 part p-methoxyphenol, the reaction mixture is stripped under reduced pressure. Approximately 13 parts of dimethyl fumarate are recovered. 124 parts of a greenish resin are obtained. It is calculated that the ratio (dimethyl maleate reacted)/(amine) is equal to 0.52.

EXAMPLE 18

100 parts reactive polyamide resin (General Mills Chemicals, Versamid 100, amine number 90) and 30 parts diethyl maleate are reacted for 5 hours as described in Example 15. During this time 5 parts ethanol are formed. Then 0.05 part p-methoxyphenol is added. On stripping under reduced pressure an additional small amount of ethanol and 6 parts diethyl fumarate are recovered. 116 parts product are obtained as a residue. The product is a clear, yellowish resin. It is calculated that the ratio (diethyl maleate reacted)/(amine) is equal to 0.80.

EXAMPLE 19

100 parts reactive polyamide resin (Emery Industries, Emerez 1512; amine number 345) and 50 parts dimethyl maleate are reacted for 4 hours at 90° C. as described in Example 15. During this time 8 parts methanol are recovered from the off-gas in a cold trap. On stripping under reduced pressure 5 parts unreacted dimethyl fumarate are recovered. Then 0.05 part p-methoxyphenol is added and the product is taken as a residue. 135 parts clear, yellow resin are obtained. It is calculated that the ratio (dimethyl maleate reacted)/(amine) is equal to 0.51.

EXAMPLE 20

100 parts reactive polyamide resin (General Mills Chemicals, Versamid 115, amine number 238) and 30 parts 5-norbornene-2,3-dicarboxylic anhydride are mixed in a vessel equipped with an agitator and blanketed with nitrogen. The reaction mixture is stirred at 90° C. for 3 hours. Then the reaction mixture is stripped at 90° C. under reduced pressure (0.1 mm Hg). No unreacted 5-norbornene-2,3-dicarboxylic anhydride is recovered. 0.05 part p-methoxyphenol is added, and the product is taken as a residue. A glass-like, yellowish solid, soluble in tetrahydrofuran, methylene chloride, etc. is obtained. It is calculated that the ratio (5-norbornene-2,3-dicarboxylic acid reacted)/(amine) is equal to 0.43.

EXAMPLE 21

100 parts reactive polyamide resin (General Mills Chemicals, Versamid 115, amine number 238) and 15 parts dimethyl maleate are reacted for 3 hours as described in Example 15. After stripping at 90° C. and 0.1 mm Hg pressure, 20 parts of 5-norbornene-2,3-dicarboxylic anhydride are added. The reaction mixture is stirred at 90° C. under a nitrogen blanket for another 3 hours. Then 0.05 part p-methoxyphenol is added and the reaction mixture is allowed to cool to room temperature. An extremely viscous resin is obtained. It is calculated that 24.5% of the amine groups are reacted with dimethyl maleate and 28.7% with 5-norbornene-2,3-dicarboxylic anhydride.

EXAMPLE 22

100 parts Versamid 115 are reacted with 45 parts dimethyl itaconate for 3 hours at 90° C. as described in Example 15. Then the reaction mixture is stripped at 0.1 mm Hg pressure. Approximately 3 parts of methanol and 20 parts of a mixture of dimethyl mesaconate, dimethyl itaconate and dimethyl citraconate (identified by gas chromatography) are removed from the reaction mixture. 0.05 part p-methoxyphenol is added and the product is taken as a residue. 120 parts clear, yellowish viscous oil are obtained.

EXAMPLE 23 — UV Curable Overprint Varnish 100 parts of the product of Example 15, 135 parts trimethylolpropane triacrylate, 30 parts hydroxyethyl acrylate, 2 parts paraffin wax (Esso wax 3150; m.p. 135° C.), and 10 parts benzoin isobutyl ether are mixed well on a roller mill. A clear, almost colorless, medium oil is obtained.

Films of 0.4 mil thickness are applied with a wire wound coating rod onto paper, aluminum foil, vinyl coated aluminum foil, polyester coated mylar, and steel. The coated substrates are exposed for 1/10 second to the UV radiation given off by a medium pressure mercury vapor lamp (Hanovia, 200 W/inch) at a distance of 5'' from the lamp. This distance coincides with the second focal point created by the elliptical reflector.

After this exposure, all the coatings are cured. They have a pencil hardness of at least 3H and rub resistance of at least 40 rubs using methyl ethyl ketone as the solvent.

EXAMPLE 24 — Electron Beam Curable Coating 20 parts of reaction product from Example 16, 20 parts trimethylolpropane triacrylate, and 20 parts neopentyl glycol diacrylate are mixed on a roller mill. A clear, slightly yellowish medium oil is obtained. Steel, wood, aluminum and plastic panels are coated with this formulation using a 1 mil film knife. The coated test panels are exposed to 6 Mrad electron beam radiation under exclusion of air. After the irradiation, the coatings are clear, colorless, hard and glasslike. They have a pencil hardness of 4H, show excellent adhesion and are unaffected by solvents.

The same type of coatings are cured in presence of air by exposing them to 20 Mrad electron beam radiation.

EXAMPLE 25 — Electron Beam Curable Coating 20 parts product from Example 22, 10 parts trimethylolpropane triacrylate, 10 parts 1,6-hexane-diol diacrylate, 10 parts acrylated epoxidized soybean oil (Union Carbide Co., Actomer X-70), and 1 part stearyl acrylate are milled on a roller mill until homogeneous. A clear, almost colorless, medium viscosity oil is obtained. Coatings of 4 mil thickness are applied with a film knife to asphalt tile, vinyl tile and wood. The coated substrates are exposed to 5 Mrad electron beam radiation under exclusion of air. After the exposure the coatings are tough, clear, colorless, not affected by solvents, and are very abrasion resistant.

EXAMPLE 26 — UV Curable Ink 50 parts of reaction product from Example 16, 20 parts trimethylolpropane triacrylate, 10 parts Lithol rubine pigment, and 3 parts stearyl acrylate are mixed and ground on a three-roll mill until homogeneous. Then 5.5 parts benzoin isobutyl ether, dissolved in 10 parts trimethylolpropane triacrylate are added and the milling is continued for a short time. The ink is applied to paper stock as a film of 0.1 – 0.4 mil thickness by means of a rubber roller. Complete cure of the ink is achieved by exposure to UV radiation for 0.5 seconds as described in Example 9.

The radiation curable coatings of this invention are extremely useful for making hard coatings without the application of extensive heat to the coated surface, and without the necessity of depositing an already cured resin from a solvent which must then be evaporated and recovered. The modified prepolymers of the present invention make it possible to prepare hard coatings by spreading a prepolymer material of convenient fluidity and then quickly curing the film to make it resistant to abrasion and to solvents.

EXAMPLE 27

10 parts dimethyl maleate - modified reactive polyamide resin (Versamid 115 — General Mills Chemicals — reacted with 40% by weight of dimethyl maleate at 90° C. for 3 hours, excess dimethyl maleate removed under reduced pressure) are mixed with 10 parts pentaerythritol tetraacrylate, 0.01 part phenothiazine, 0.4 part Esso wax 3150 (paraffin wax, m.p. approx. 132° C.), 0.8 part benzoin isobutyl ether and 20 parts methylene chloride. A clear, low viscosity oil is obtained.

A carrier paper made of smooth clay coated sheet weighing about 16 pounds per ream (500 sheets, 20 × 25 inches) is coated with the above solution using a No. 20 Mayer rod. The coated paper then is exposed for 1/10 second to the UV radiation given off by a medium pressure mercury vapor lamp (Hanovia, 200 W/inch) at a distance of 5 inches from the lamp. This distance coincides with the second focal point created by the elliptical reflector. By this exposure, the coating is cured to a hard, glossy film which has a pencil hardness of 3H.

The radiation cured release coating is then print coated with a clear lacquer composed of 6 parts cellulose acetate — butyrate (Eastman EAB 171–40), 55 parts ethylacetate, 28 parts toluene, and 11 parts 95% ethanol (Printing grade). Print coating is accomplished using a regular varnish etch cylinder having a depth of about 20 to 40 microns, 120 line screen and a 15–20 wall (equivalent to No. 8 Mayer rod.). The applied lacquer coating is dried at 140° F. for 1 minute.

The design print is then printed over the clear lacquer layer using polyamide — nitrocellulose modified ink containing pigment or dye of the color desired (ZYROTO WHITE, sold by Gotham Ink and Color Co., which contains a titanium dioxide pigment). The area of the design print is smaller than that of the printed lacquer layer and falls wholly within the margin of the lacquer layer.

Over the ink, as an overprint, there is then coated a clear adhesive layer comprising a solution of heat-activatable thermoplastic polyamide resin in lacquer form (VERSAMIDE 940, sold by General Mills) followed by drying the adhesive to a dry non-tacky state. The area of the adhesive overprint is smaller than that of the lacquer and it falls wholly within the margins of the lacquer layer.

There is no pick-up during the three printing operations.

The heat transfer label, as formed above, is then put in contact with a polyethylene bottle, the surface of which has been treated to render it more print receptive in a conventional manner such as by flame contact. Heat and pressure are applied to the temporary backing to effect pressing of the adhesive layer against the polyethylene surfaces. As heat is applied, approximately 350° F., there is no softening of the release layer or the cellulose acetate layer, but the adhesive overprint is heat-activated to a highly tacky state and bonds to the polyethylene surface of the bottle. The temporary backing may then be stripped from the transfer label or may be left on the transfer and stripped at a subsequent time without danger of delaminating the transfer from the polyethylene surface. No portion of the release layer is left over the transfer after stripping of the temporary backing and no portion of the lacquer is removed with the release layer. After cooling and peeling of the temporary backing, the bottle so coated is flame treated and the adherence of the label thereto is determined. Adherence was excellent.

EXAMPLE 28

Same as Example 27, except that 1.0 part of cyclododecane is used in place of the Esso Wax 3150.

EXAMPLE 29

Same as Example 27, except that 1.0 part stearic acid is used in place of Esso Wax 3150.

EXAMPLE 30

Same as Example 27, except that 1.4 parts γ-methacryl oxypropyl trimethoxy silane (Union Carbide silane A-174) are used in place of the Esso Wax 3150.

EXAMPLE 31

Same as Example 27, except that 0.6 part E-wax (Farbwerke Hoechst AG, Montan type wax) is used in place of the Esso wax 3150.

EXAMPLE 32

Same as Example 27, except that 1.0 part FL-wax (Farbwerke Hoechst AG, Montan type wax) is used in place of the Esso wax 3150.

EXAMPLE 33

Same as Example 27, except that 1.4 parts F-wax (Farbwerke Hoeschst AG, Montan type wax) are used in place of the Esso wax 3150.

EXAMPLE 34

Same as Example 27, except that 0.5 part octadecanol is used in place of the Esso wax 3150.

EXAMPLE 35

Same as Example 27, except that 1.0 part oleamide (Armour Industrial Chemical Co., Armid O) is used in place of the Esso wax 3150.

EXAMPLE 36

Same as Example 27, except that 1.4 parts stearyl acrylate are used in place of the Esso wax 3150.

EXAMPLE 37

Same as Example 27, except that 0.6 part isodecyl acrylate is used in place of the Esso wax 3150.

EXAMPLE 38

Same as Example 27, except that 1.0 part fluorolube LG-160 (Hooker Chemicals Co.) is used in place of the Esso wax 3150.

EXAMPLE 39

Same as Example 27, except that 1.4 part halocarbon wax (Halocarbon Products Corp.) is used in place of the Esso wax 3150.

EXAMPLE 40

Same as Example 27, except that 1.0 part silicone S-30 (Union Carbide Co.) is used in place of the Esso wax 3150.

EXAMPLE 41

Same as Example 27, except that 1.0 part silicone L-31 (Union Carbide Co.) is used in place of the Esso wax 3150.

EXAMPLE 42

Same as Example 27, except that 0.5 part Syl-Off 291 (Dow Corning Co.) is used in place of the Esso wax 3150.

EXAMPLE 43

Same as Example 27, except that 1.0 part Syl-Off 291 containing 6% Catalyst 23A (Dow Corning Co.) is used in place of the Esso wax 3150.

EXAMPLE 44

Same as Example 27, except that 1.0 part V-wax (Farbwerke Hoechst AG, poly [octadecyl vinyl ether]) is used in place of the Esso wax 3150.

EXAMPLE 45

Same as Example 27, except that 1.4 parts W-wax (Farbwerke Hoechst AG, hydrogenated animal fat) is used in place of the Esso wax 3150.

EXAMPLE 46

22.6 parts unsaturated polyurethane prepared from 1 mole polyether triol, 3 moles, 2,4-toluene diisocyanate, and 3 moles 2-hydroxyethyl acrylate, 20.4 parts 2-hydroxyethyl acrylate, 20.15 parts pentaerythritol tetraacrylate, 18.38 parts 1,6-hexanediol diacrylate, 12.44 parts trimethylol propane triacrylate, 6.03 parts acrylated epoxidized soybean oil (Union Carbide Co., Actomer X-70), 6.0 parts benzoin isobutyl ether, 2.0 parts Esso wax 3150 (paraffin wax, melting point approx. 132° C.) and 30 parts methylene chloride are mixed well until a homogeneous solution is obtained.

A carrier paper made of smooth clay coated sheet weighing about 16 pounds per ream (500 sheets, 10 inches × 25 inches) is coated with the above solution using a No. 20 Mayer rod. The coated paper then is exposed for 1/10 second to the UV-radiation given off by a medium pressure mercury vapor lamp (Hanovia, 200 W/inch) at a distance of 5 inches from the lamp. This distance coincides with the second focal point created by the elliptical reflector. By this exposure, the coating is cured to a hard, glossy film which has a pencil hardness of 3H.

The radiation cured release coating is then print coated with a clear lacquer composed of 6 parts cellulose acetate — butyrate (Eastman EAB 171-40), 55 parts ethylacetate, 28 parts toluene and 11 parts 95% ethanol (printing grade). Print coating is accomplished using a regular varnish etch cylinder having a depth of about 20 to 40 microns, 120 line screen and a 15-20 wall (equivalennt to 8 Mayer rod). The applied lacquer coating is dried at 140° F. for 1 minutes.

The design print is then printed over the clear lacquer layer using polyamide — nitrocellulose modified ink containing pigment or dye of the color desired (ZYROTO WHITE, sold by Gotham Ink and Color Co., which contains a titanium dioxide pigment). The area of the design print is smaller than that of the printed lacquer layer and falls wholly within the margin of the lacquer layer.

Over the ink, as an overprint, there is then coated a clear adhesive layer comprising a solution of a heat-activatable thermoplastic polyamide resin in lacquer form (VERSAMIDE 940, sold by General Mills) followed by drying the adhesive to a dry non-tacky state. The area of the adhesive overprint is smaller than that of the lacquer and it falls wholly within the margins of the lacquer layer.

There is no pick-up during the three printing operations.

The heat transfer label, as formed above, is then put in contact with a polyethylene bottle, the surface of which has been treated to render it more print receptive in a conventional manner such as by flame contact. Heat and pressure are applied to the temporary backing to effect pressing of the adhesive layer against the polyethylene surfaces. As heat is applied, approximately 350° F., there is no softening of the release layer or the cellulose acetate layer, but the adhesive overprint is heat-activated to a highly tacky state and bonds to the polyethylene surface of the bottle. The temporary backing may then be stripped from the transfer label or may be left on the transfer and stripped at a subsequent time without danger of delaminating the transfer from the polyethylene surface. No portion of the release layer is left over the transfer after stripping of the temporary backing and no portion of the lacquer is removed with the release layer. After cooling and peeling of the temporary backing, the bottle so coated is flame treated and the adherence of the label thereto is determined. Adherence was excellent.

EXAMPLE 47

Same as Example 46, except that 3.0 parts of cyclododecane are used in place of the Esso wax 3150.

EXAMPLE 48

Same as Example 46, except that 2.0 parts stearic acid are used in place of Esso wax 3150.

EXAMPLE 49

Same as Example 46, except that 2.4 parts γ-methacryl oxypropyl trimethoxy silane (Union Carbide silane A-174) are used in place of the Esso wax 3150.

EXAMPLE 50

Same as Example 46, except that 3.0 parts E-wax (Farbwerke Hoechst AG, Montan type wax) are used in place of the Esso wax 3150.

EXAMPLE 51

Same as Example 46, except that 2.0 parts FL-wax (Farbwerke Hoechst AG, Montan type wax) are used in place of the Esso wax 3150.

EXAMPLE 52

Same as Example 46, except that 2.4 parts F-wax (Farbwerke Hoechst AG, Montan type wax) are used in place of the Esso wax 3150.

EXAMPLE 53

Same as Example 46, except that 3.0 parts octadecanol are used in place of the Esso wax 3150.

EXAMPLE 54

Same as Example 46, except that 4.0 parts oleamide (Armour Industrial Chemical Co., Armid 0) are used in place of the Esso wax 3150.

EXAMPLE 55

Same as Example 46, except that 3.0 parts stearyl acrylate are used in place of the Esso wax 3150.

EXAMPLE 56

Same as Example 46, except that 2.5 parts isodecyl acrylate are used in place of the Esso wax 3150.

EXAMPLE 57

Same as Example 46, except that 3.0 parts fluorolube LG-160 (Hooker Chemicals Co.) are used in place of the Esso wax 3150.

EXAMPLE 58

Same as Example 46, except that 3.0 parts halocarbon wax (Halocarbon Products Corp.) are used in place of the Esso wax 3150.

EXAMPLE 59

Same as Example 46, except that 4.0 parts silicone S-30 (Union Carbide Co.) are used in place of the Esso wax 3150.

Example 60

Same as Example 46, except that 4.0 parts silicone L-31 (Union Carbide Co.) are used in place of the Esso wax 3150.

EXAMPLE 61

Same as Example 46, except that 2.0 parts Syl-Off 291 (Dow Corning Co.) are used in place of the Esso wax 3150.

EXAMPLE 62

Same as Example 46, except that 4.0 parts Syl-Off 291 containing 6% Catalyst 23A (Dow Corning Co.) are used in place of the Esso wax 3150.

EXAMPLE 63

Same as Example 46, except that 3.0 parts V-wax (Farbwerke Hoechst AG, poly (octadecyl vinyl ether)) are used in place of the Esso wax 3150.

EXAMPLE 64

Same as Example 46, except that 2.4 parts W-wax (Farbwerke hoechst AG, hydrogenated animal fat) are used in place of the Esso wax 3150.

EXAMPLE 65

66.3 parts unsaturated polyurethane, prepared from 1 mole polyether triol (Voranol CP700), 3 moles 2,4-toluene diisocyanate, and 3 moles 2-hydroxyethyl acrylate, 72.3 parts trimethylolpropane triacrylate, 1.5 parts 2-hydroxyethyl acrylate, 68 parts 1,4-butanediol diacrylate, 50 parts acrylated epoxidized soybean oil (Union Carbide Co., Actomer X-70), 2 parts stearyl acrylate, 15.6 parts benzoin isobutyl ether and 5.0 parts Union Carbide Co. silicone rubber W-982 (polydimethyl siloxane with some unsaturation) are mixed well on a roller mill. A clear, colorless homogeneous light oil is obtained as the product.

Films of 0.2 — 1 mil thickness are applied with wire wound coating rods onto paper. The coated paper is exposed to the UV-radiation given off by a medium pressure mercury vapor lamp (Hanovia, 200 W/inch) at a distance of 5 inches from the lamp (second focal point created by the elliptical reflector). After this exposure the films are cured to hard, glossy coatings.

9 lbs./ream removable adhesive is cast on a paper substrate; then the coated paper is laminated to the release paper. The force to peel a 1 inch wide strip at 12 inches/min. is 43 g./linear inch.

EXAMPLE 66

66.3 parts unsaturated polyurethane, prepared from 1 mole polyether triol (Voranol CP700), 3 moles 2,4-toluene diisocyanate, and 3 moles 2-hydroxyethyl acrylate, 72.3 parts trimthylol propane triacrylate, 1.5 parts 2-hydroxyethyl acrylate, 68 parts 1,4-butanediol diacrylate, 50 parts acrylated epoxidized soybean oil (Union Carbide Co., Actomer X-70), 2 parts stearyl acrylate, 15.6 parts benzoin isobutyl ether and 10.0 parts Viscasil 60000 (General Electric; poly[dimethylsiloxane] viscosity 60'0000 ctsk) are mixed well on a roller mill. A clear, colorless homogeneous light oil is obtained as the product.

Films of 0.2 – 1 mil thickness are applied with wire wound coating rods onto paper. The coated paper is exposed to the UV-radiation given off by a medium pressure mercury vapor lamp (Hanovia, 200 W/inch) at a distance of 5 inches from the lamp (second focal point created by the elliptical reflector). After this exposure the films are cured to hard, glossy coatings.

9 lbs./ream removable adhesive is cast on a paper substrate; then the coated paper is laminated to the release paper. The force to peal a 1 inch wide strip at 12 inches/min. is 55 g./linear inch.

EXAMPLE 67

66.3 parts unsaturated polyurethane, prepared from 1 mole polyether triol (Voranol CP700), 3 moles 2,4-toluene diisocyanate, and 3 moles 2-hydroxyethyl acrylate, 72.3 parts trimethylol propane triacrylate, 1.5 parts 2-hydroxyethyl acrylate, 68 parts 1,4-butanediol diacrylate, 50 parts acrylated epoxidized soybean oil (Union Carbide Co., Actomer X-70), 2 parts stearyl acrylate, 15.6 parts benzoin isobutyl ether and 6.43 parts silicone L-31 (Union Carbide Co.; poly [methyl hydrogen siloxane]) are mixed well on a roller mill. A clear, colorless light oil is obtained as the product.

Films of 0.2 – 1 mil thickness are applied with wire wound coating rods onto paper. The coated paper is exposed to the UV-radiation given off by a medium pressure mercury vapor lamp (Hanovia, 200 W/inch) at a distance of 5 inches from the lamp (second focal point created by the elliptical reflector). After this exposure the films are cured to hard, glossy coatings.

9 lbs./ream removable adhesive is cast on a paper substrate; then the coated paper is laminated to the release paper. The force to peel a 1 inch wide strip at 12 inches/min. is 80 g./linear inch.

EXAMPLE 68

66.3 parts unsaturated polyurethane, prepared from 1 mole polyether triol (Voranol CP700), 3 moles 2,4-toluene diisocyanate, and 3 moles 2-hydroxyethyl acrylate, 72.3 parts trimethylol propane triacrylate, 1.5 parts 2-hydroxyethyl acrylate, 68 parts 1,4-butanediol diacrylate, 50 parts acrylated epoxidized soybean oil (Union Carbide Co., Actomer X-70), 2 parts stearyl acrylate, 15.6 parts benzoin isobutyl ether and 2.65 parts silicone L-522 (Union Carbide Co.; poly dimethyl siloxane with some hydroxyethyl groups) are mixed well on a roller mill. A clear, homogeneous light oil is obtained as the product.

Films of 0.2 – 1 mil thickness are applied with wire wound coating rods onto paper. The coated paper is exposed to the UV-radiation given off by a medium pressure mercury vapor lamp (Hanovia, 200 W/inch) at a distance of 5 inches from the lamp (second focal point created by the elliptical reflector). After this exposure the films are cured to hard, glossy coatings.

9 lbs./ream removable adhesive is cast on a paper substrate; then the coated paper is laminated to the release paper. The force to peel a 1 inch wide strip at 12 inches/min. is 30 g./linear inch.

The release coatings of this invention can also be made by radiation curing of a wax-containing acrylic prepolymer. This is illustrated by the next example.

EXAMPLE 69

75 parts trimethylol propane triacrylate, 25 parts neopentyl glycol diacrylate, 5 parts halocarbon wax (Halocarbon Products Corp.; blend of completely halogenated chlorofluorocarbons) and 10 parts benzoin isobutyl ether are milled on a 3 roller mill until homogeneous. A clear solution is obtained.

Films of 0.2 – 1 mil thickness are applied with a wire wound coating rod onto paper. The coated paper is exposed to the UV-radiation given off by a medium pressure mercury vapor lamp (Hanovia, 200 W/inch) at a distance of 5 inches from the lamp (second focal point created by the elliptical reflector). After this exposure the films are cured to hard, glossy coatings.

9 lbs./ream removable adhesive is cast on a paper substrate; then the coated paper is laminated to the release paper. The force to peel a 1 inch wide strip at 12 inches/min. is 31 g./linear inch.

Example 69 illustrates that the new class of radiation curable release type coatings according to the invention may be made without any polyurethane or polyamide component in the unsaturated resin. A polyurethane or polyamide content in the radiation curable unsaturated prepolymer is, however, a practical necessity for a satisfactory ink, overprint varnish or panel or tile coating.

EXAMPLE 70

864 parts of a tetra isocyanate (Desmmodur HL TDI – isocyanurate; prepared from 4 moles of 2,4Toluene diisocyanate and 1 mole hexamethylene diisocyanate; MW 864; isocyanatye equivalent 216), 1000 parts dried tetrahydrofuran, and 1.0 part stannous octoate are placed in a vessel equipped with an agitator and blanketed with nitrogen. Then 1628 parts poly(propylene oxide)diol (Dow Voranol P 400; hydroxyl No. 275; 0.02% H₂O) are added at such a rate that the temperature of the reaction mixture does not rise above 50° C. The reaction mixture is stirred at this temperature for an additional one hour. Following this step, 510 parts 2-hydroxyethyl acrylate (10% excess) are added at such a rate that the reaction mixture starts to reflux gently. The stirring is continued at reflux for an additional 1 hour. At the end of this period 2.0 parts p-methoxyphenol is added and the solvent is removed under reduced pressure. A clear, colorless, viscous oil is obtained as the product.

EXAMPLE 71

348 parts 2.4-toluene diisocyanate, 500 parts dried tetrahydrofuran and 0.5 part stannous octoate are placed in a vessel equipped with an agitator and blanketed with nitrogen. Then 400 parts poly(ethylene oxide)diol (hydroxyl No. 280) dissolved in 200 parts dried tetrahydrofuran are added at such a rate that the temperature of the reaction mixture does not rise above 50° C. The reaction mixture is stirred at this temperature for an additional 1 hour. Following this step, 286 parts hydroxethyl methacrylate (10% excess) are added at such a rate that the reaction mixture begins to reflux. Then the stirring is continued at reflux for an additional one hour. At the end of this period 1.0 part p-methoxy phenol is added and the solvent is removed under reduced pressure. A clear, colorless, viscous oil is obtained as the product.

I claim:

1. A film-forming, spreadable, polymerizable composition suitable for forming thin layers of flexible, abrasion and solvent resistant inks and coatings on a solid surface by rapid radiation curing in about one second or less, said composition comprising a liquid prepolymer which is the stepwise reaction product of (a) substantially three mols of a polyisocyanate with (b) substantially one mol of a polyether triol and (c) an unsaturated alcohol selected from allyl alcohol, 5-norbornene-2-methanol and hydroxy lower esters of acrylic or methacrylic acid; and sufficient acrylate ester monomer copolymerizable by radiation with said prepolymer to provide coating viscosity, said monomer including at least one monomer having three or more unsaturated acrylate or methacrylate groups to promote cross-linking of said layer.

2. A composition in accordance with claim 1 wherein said prepolymer is the stepwise reaction product of said polyisocyanate with said triol, which has secondary hydroxyl groups, and said unsaturated alcohol.

3. A composition in accordance with claim 1 wherein said polyisocyanate is toluene diisocyanate.

4. A composition according to claim 3 wherein said prepolymer is the reaction product of substantially three mols of said hydroxyl lower esters of acrylic or methacrylic acid.

5. A composition according to claim 4 wherein said polyester is a poly (propylene oxide) triol, said unsaturated alcohol is a hydroxyl lower alkyl ester of acrylic acid, and said monomer is a mixture of at least one low viscosity liquid mono or diacrylate and at least one higher viscosity monomer having three or more acrylate groups.

6. A compposition according to claim 5 further including about 1–20% by weight of a photosensitizer for promoting rapid cure under exposure of ultraviolet light.

7. A composition according to claim 6 wherein said higher viscosity monomer having three or more acrylate groups is trimethylolpropane triacylate.

8. A composition according to claim 1 wherein said monomer is present in a ratio to said prepolymer within the range of about 1:1 and 4:1.

9. A radiation curable prepolymer material as defined in claim 1 containing 1–20% by weight of a photoinitiator selected from the group consisting of acyloins and acyloin derivatives.

10. A radiation curable prepolymer material as defined in claim 1 containing 1–20% by weight of a photoinitiator selected from the group consisting of benzoin lower alkyl ethers, acetophenone, benzophenon, benzil, Michlers ketone and mixtures of two or more of them.

* * * * *